United States Patent
Liu et al.

(10) Patent No.: US 7,633,190 B2
(45) Date of Patent: Dec. 15, 2009

(54) VOICE COIL MOTORS

(75) Inventors: Chien-Sheng Liu, Tainan County (TW); Po-Heng Lin, Hualien County (TW); Shun-Sheng Ke, Kaohsiung (TW); Yu-Hsiu Chang, Changhua County (TW); Ji-Bin Horng, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 12/037,014

(22) Filed: Feb. 25, 2008

(65) Prior Publication Data

US 2009/0140581 A1    Jun. 4, 2009

(30) Foreign Application Priority Data

Dec. 4, 2007    (TW) .............. 96146064 A

(51) Int. Cl.
*H02K 33/00*    (2006.01)
(52) U.S. Cl. .......................... 310/15; 310/36
(58) Field of Classification Search ............. 310/12, 310/13, 14, 15, 36
See application file for complete search history.

(56) References Cited

U.S. PATENT DOCUMENTS

| 5,220,461 | A | 6/1993 | Inoue et al. | |
|---|---|---|---|---|
| 6,307,285 | B1 * | 10/2001 | Delson et al. | 310/14 |
| 6,787,943 | B2 * | 9/2004 | Godkin | 310/12 |
| 6,885,116 | B2 * | 4/2005 | Knirck et al. | 310/12 |
| 6,960,847 | B2 * | 11/2005 | Suzuki et al. | 310/14 |
| 2008/0036304 | A1 * | 2/2008 | Ho et al. | 310/12 |

FOREIGN PATENT DOCUMENTS

| JP | 2003-207708 | 7/2003 |
|---|---|---|
| JP | 2005-128405 | 5/2005 |
| JP | 2006-220776 | 8/2006 |
| TW | 176799 | 1/1992 |
| TW | 200525859 | 8/2005 |
| TW | M305361 | 1/2007 |

* cited by examiner

*Primary Examiner*—Nguyen N Hanh
(74) *Attorney, Agent, or Firm*—Quintero Law Office

(57) ABSTRACT

A voice coil motor. A guide bar connects to a fixed base. A coil connects to the fixed base and includes a first winding portion and a second winding portion. A current direction in the first winding portion is opposite that in the second winding portion. A support base movably fits on the guide bar. A magnetic member connects to the support base and includes a first magnetic pole and a second magnetic pole. A magnetization direction of the magnetic member parallels a moving direction of the support base and magnetic member and is perpendicular to a central axis of the coil. The first and second magnetic poles respectively oppose the first and second winding portions of the coil. The first and second magnetic poles respectively interact with the first and second winding portions to generate a first force and a second force, moving the support base and magnetic member.

6 Claims, 6 Drawing Sheets

VOICE COIL MOTORS

BACKGROUND OF THE INVENTION

1. Field of the Invention

The invention relates to voice coil motors, and more particularly to voice coil motors with reduced size, manufacturing costs, and electrical power consumption and enhanced positioning precision.

2. Description of the Related Art

Cameras disposed in cellular phones have been developed to provide high definition quality and reduced power consumption, manufacturing costs, and size. As such, actuators disposed in the cameras, for moving lens modules thereof, are critical.

Automatic displacement driving devices applied in lens modules may employ drivers providing rotational power with a rotational axis thereof paralleling an optical axis of a lens module or drivers providing movement power with a moving direction thereof paralleling the optical axis of the lens module.

An example of a driver providing rotational power with a rotational axis thereof paralleling an optical axis of a lens module is a stepping motor. The driver requires additional transmission-conversion mechanisms to enable the lens module to move along an optical axis. When the lens module arrives at a final position, no electricity is required to maintain the lens module therein. However, the driver has many components. Thus, the structure of the driver is complicated, and the size thereof cannot be reduced.

An example of a driver providing movement power with a moving direction thereof paralleling an optical axis of a lens module is a voice coil motor, a piezoelectric actuator, or a liquid lens actuator. The driver directly adjusts the position of the lens module. Compared with the driver providing rotational power, this driver has fewer components and is small. Nevertheless, there is a need to further reduce the size and enhance precision of this driver.

Taiwan Patent Publication No. 200525859 discloses a voice coil motor with two opposite non-annular magnets and multiple yoke sets. The non-annular magnets and yoke sets form a movable magnetic assembly. Part of the magnetic lines is output from the surface of the non-annular magnets and is transmitted to a magnetic-permeable shaft via the yoke sets, generating radial attraction (radial pre-compression force) between the movable magnetic assembly and the magnetic-permeable shaft. The radial attraction enables the movable magnetic assembly to slide with respect to the magnetic-permeable shaft in a smooth manner. Moreover, in the voice coil motor, generation of a voice coil force between a coil and the non-annular magnets utilizes part of the magnetic lines with the same direction and route.

Referring to FIG. 1A and FIG. 1B, Japan Patent Publication No. 2005-128405 discloses a conventional lens driving device 1. An upper spring 9 and a lower spring 11 enable precise movement of a lens module 20 and reduce friction during movement thereof. The upper spring 9 and lower spring 11 may be regarded as extensions of the coil 15, serving as conductors at two ends thereof. Specifically, in the lens driving device 1, the upper spring 9 and lower spring 11 can provide axial pre-compression force to the lens module 20. Thus, the lens module 20 can be easily positioned in a specific position when the coil 15 is energized by application of a current. Nevertheless, as the lens driving device 1 must comprise a yoke 3 providing magnetic-permeable functions, the size and manufacturing costs thereof cannot be reduced.

Taiwan Patent No. M305361 discloses a voice coil motor having a permanent magnet with a two-pole magnetization direction. Namely, the magnetization direction of the permanent magnet is perpendicular to a moving direction thereof. The permanent magnet with the two-pole magnetization direction can enhance utilization of magnetic flux. Nevertheless, if the shape of the permanent magnet is not a cuboid, this has further resulting in poor production of the permanent magnet due to the difficult magnetization. The cost and the size thereof cannot be reduced.

Japan Patent Publication No. 2003-207708, Japan Patent Publication No. 2006-220776, and U.S. Pat. No. 5,220,461 disclose voice coil motors with a magnetization direction of a permanent magnet perpendicular to a moving direction thereof (i.e. the permanent magnet is radially magnetized). To enhance utilization of magnetic flux from the permanent magnet, magnetic-permeable yokes are disposed on the radial lateral of the permanent magnet. However, reduction of the size of the voice coil motors is not easily achieved. Moreover, in the voice coil motors, to pass a lens module through a coil, the coil must provide a large hollow portion. Accordingly, the winding turns of the coil providing the large hollow portion are limited, adversely affecting enhancement of a voice coil force. Furthermore, the overall strength of the coil providing the large hollow portion is insufficient, causing deformation during assembly thereof, and further resulting in poor production of the voice coil motors.

Taiwan Patent Publication No. 200525859 and Taiwan Patent No. 176799 disclose voice coil motors with a magnetization direction of a permanent magnet parallel to a moving direction thereof (namely, the permanent magnet is axially magnetized). In the voice coil motors, a coil is disposed between multiple permanent magnets and magnetic-permeable yokes and two gaps exist between a movable part and a fixed part. Specifically, one gap exists between the permanent magnets and the coil while the other exists between the magnetic-permeable yokes and the coil. Due to the two gaps and magnetic-permeable yokes, the size thereof cannot be reduced. Moreover, as guide bars of the voice coil motors are composed of magnetic-permeable material, magnetic attraction is generated between the guide bars and the permanent magnets, such that a starting current required to overcome sliding friction is increased. Additionally, considerations exist concerning whether there is limitation for the winding turns of the coil and whether disposition of a sensor matches the outer circumference of the coil.

Hence, there is a need for voice coil motors with reduced size, manufacturing costs, and electrical power consumption and enhanced positioning precision.

BRIEF SUMMARY OF THE INVENTION

A detailed description is given in the following embodiments with reference to the accompanying drawings.

An exemplary embodiment of the invention provides a voice coil motor comprising a fixed base, at least one guide bar, at least one coil, a support base, and at least one magnetic member. The guide bar is connected to the fixed base. The coil is connected to the fixed base and comprises a first winding portion and a second winding portion connected to and opposite the first winding portion. A current direction in the first winding portion is opposite to that in the second winding portion. The support base is movably fit on the guide bar. The magnetic member is connected to the support base and comprises a first magnetic pole and a second magnetic pole. A magnetization direction of the magnetic member parallels a moving direction of the support base and magnetic member and is perpendicular to a central axis of the coil. The first and second magnetic poles respectively oppose the first and second winding portions of the coil. The first magnetic pole interacts with the first winding portion to generate a first force. The second magnetic pole interacts with the second winding portion to generate a second force. The first and second forces drive the support base and magnetic member to move along the magnetization direction of the magnetic member.

The guide bar comprises non-magnetic-permeable material.

The guide bar is integrally formed with the fixed base.

The voice coil motor further comprises a magnetic-permeable yoke disposed between the support base and the magnetic member.

The voice coil motor further comprises a position sensor connected to the fixed base and opposing the magnetic member, detecting movement of the magnetic member.

The position sensor comprises a Hall sensor, a magnetic resistance sensing element, an electrical sensing element, or a light sensing element.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

First Embodiment

Figure 1A:
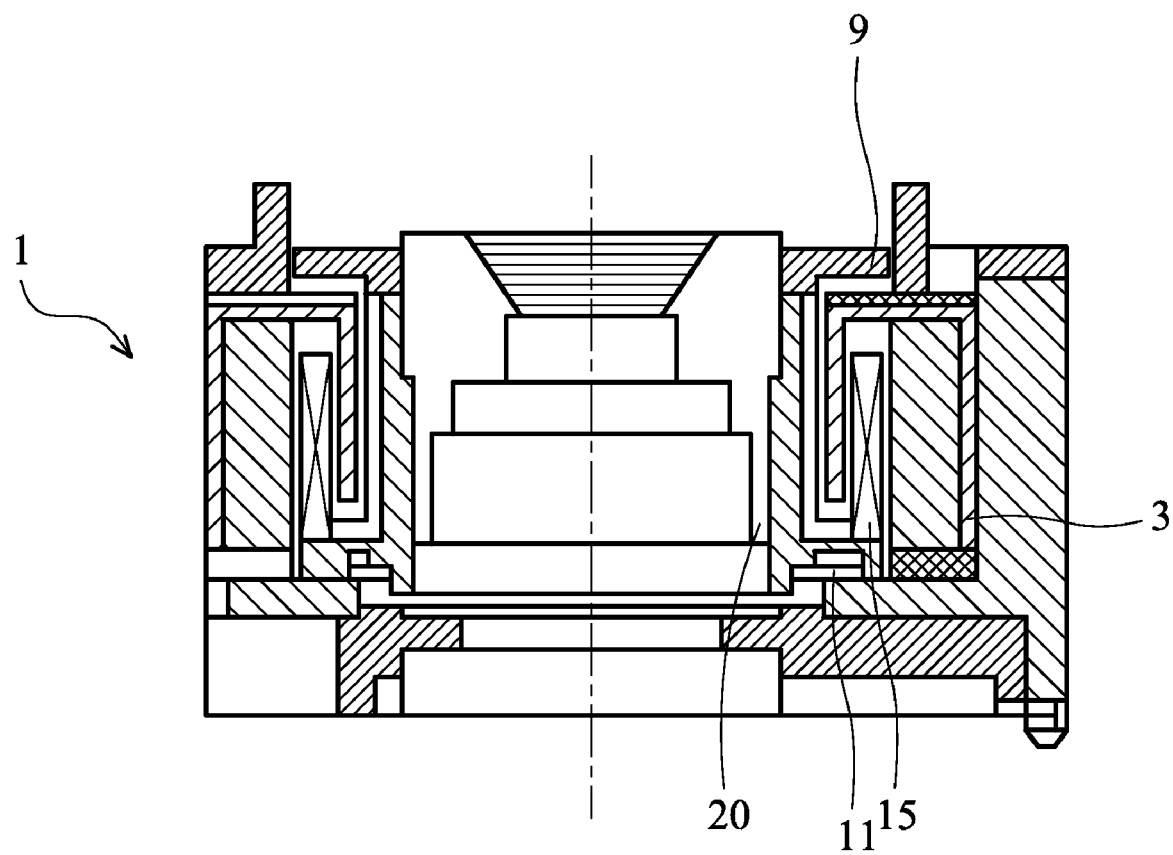
FIG. 1A is a schematic cross section of a conventional lens driving device.
Figure 1B:
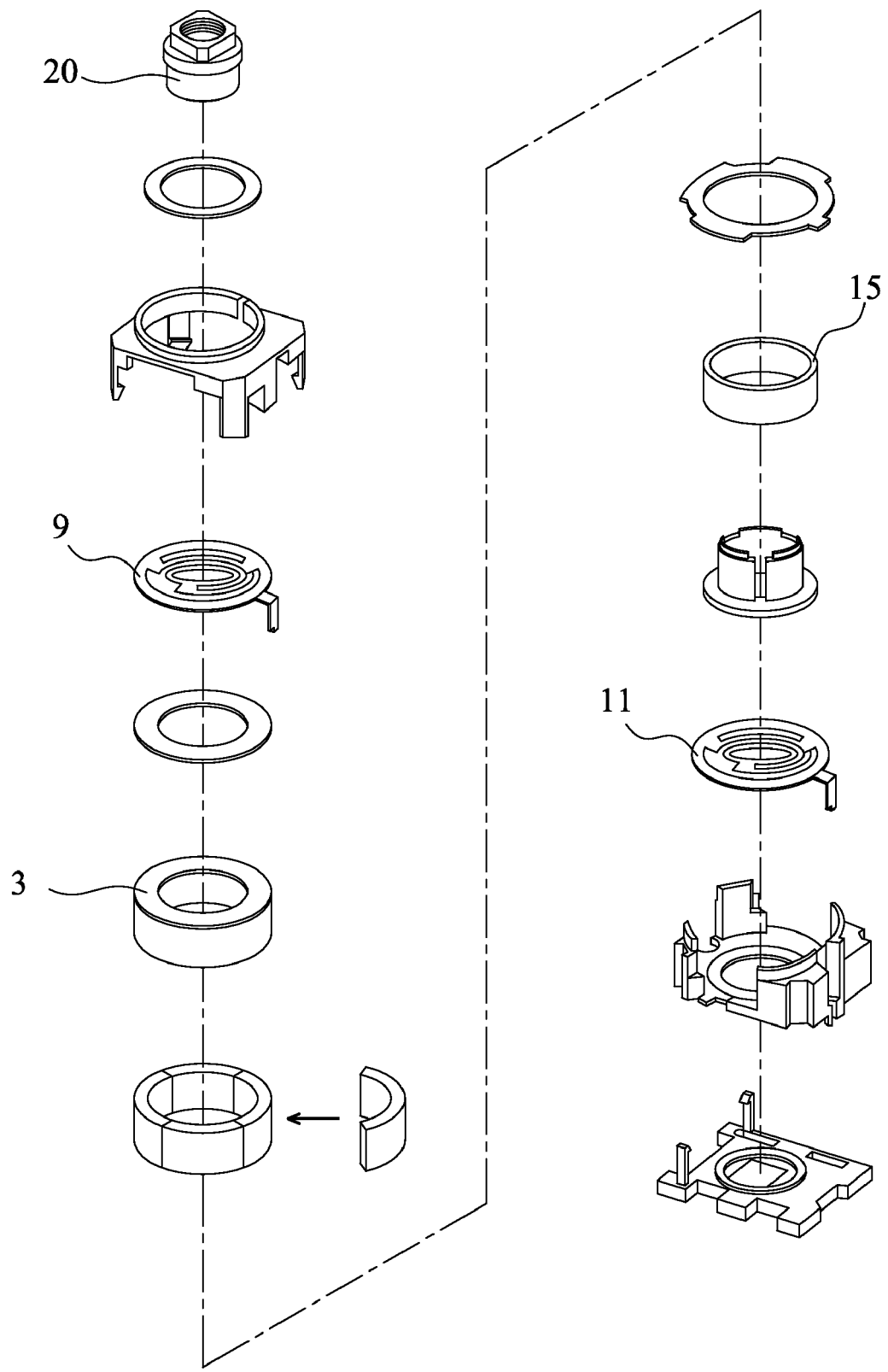
FIG. 1B is an exploded perspective view of the conventional lens driving device of FIG. 1A.
Figure 2A:
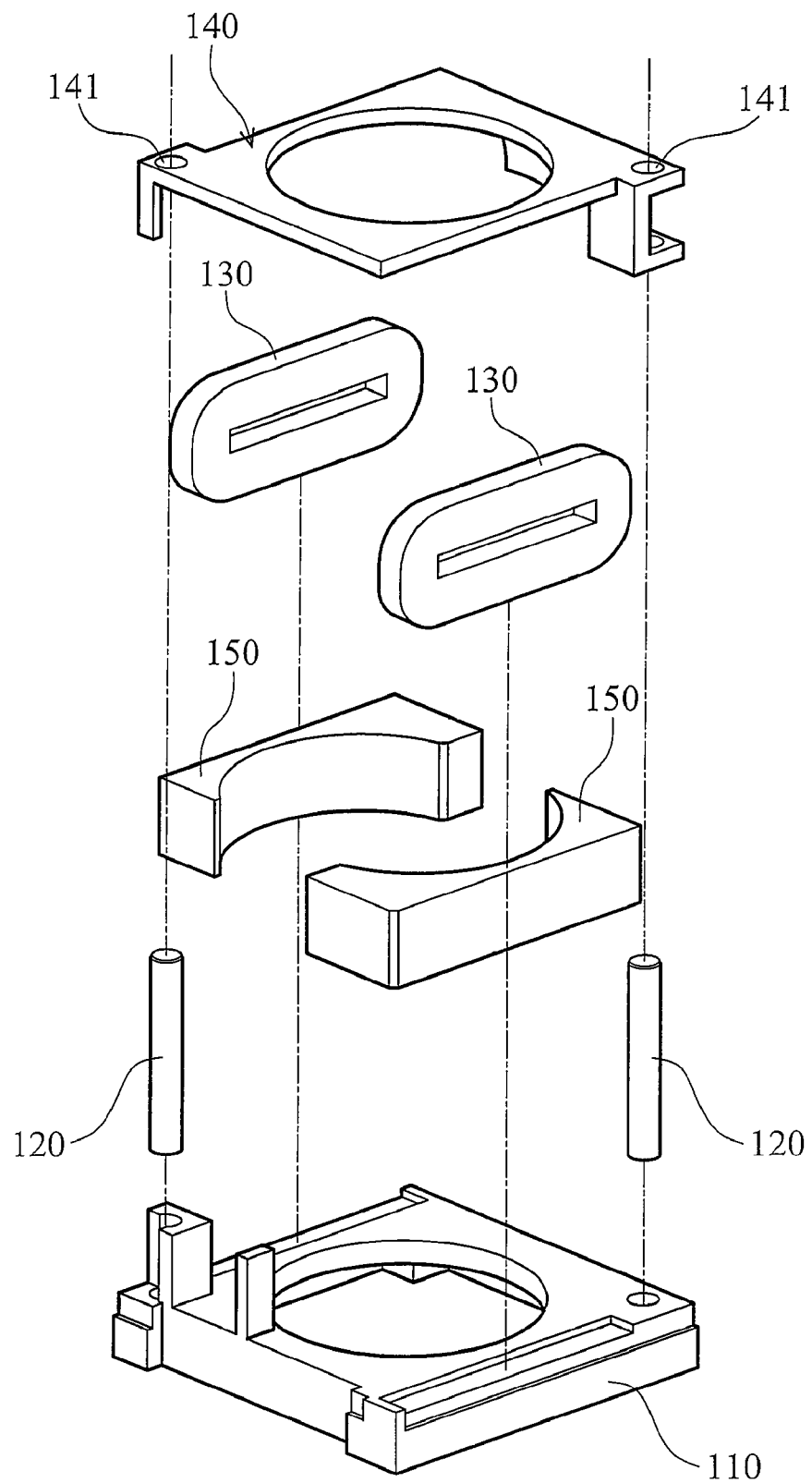
FIG. 2A is an exploded perspective view of a voice coil motor of a first embodiment of the invention.
Figure 2B:
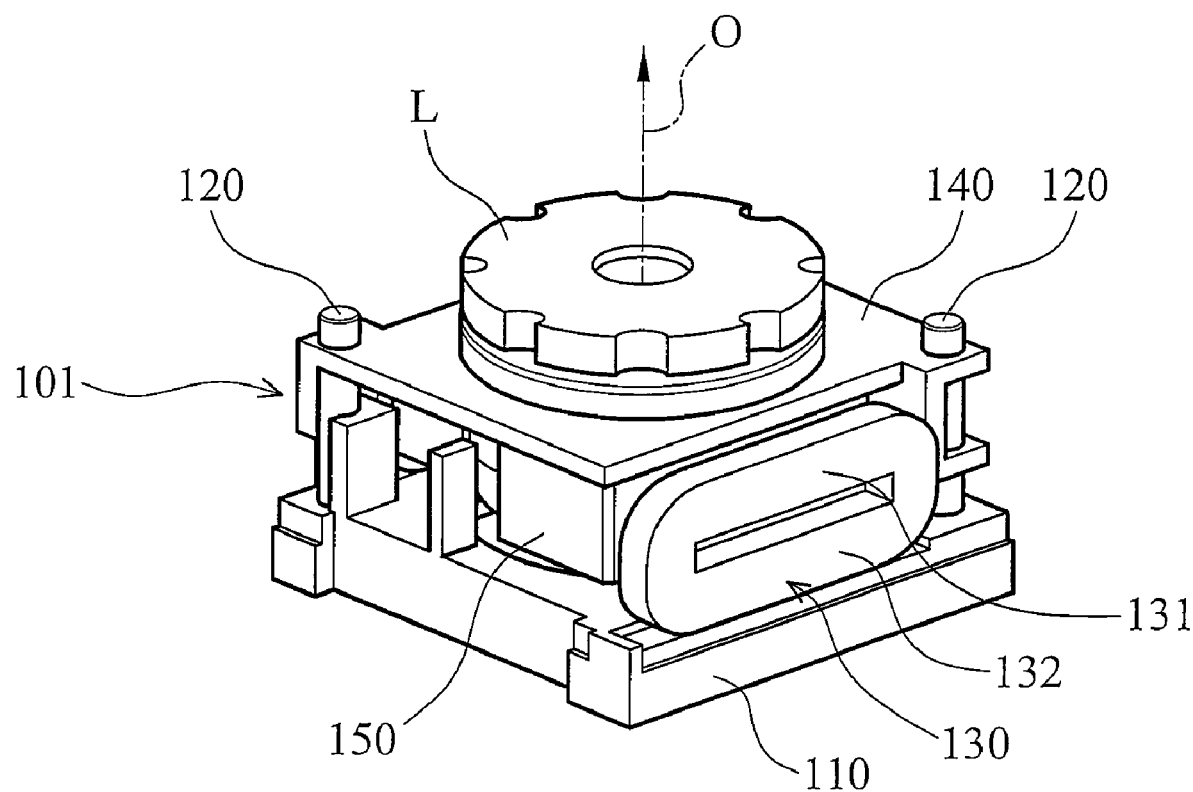
FIG. 2B is a perspective assembly view of a lens module and the voice coil motor of the first embodiment of the invention.

Referring to FIG. 2A and FIG. 2B, a voice coil motor 101 drives a lens module of a camera to perform zoom movement and comprises a fixed base 110, two guide bars 120, two coils 130, a support base 140, and two magnetic members 150. The fixed base 110, guide bars 120, and coils 130 may be regarded as fixed members of the voice coil motor 101, while the support base 140 and magnetic members 150 may be regarded as movable members thereof.

The guide bars 120 are connected to the fixed base 110. Here, the guide bars 120 comprise non-magnetic-permeable material. In this embodiment, the guide bars 120 are integrally formed with the fixed base 110.

Figure 3:
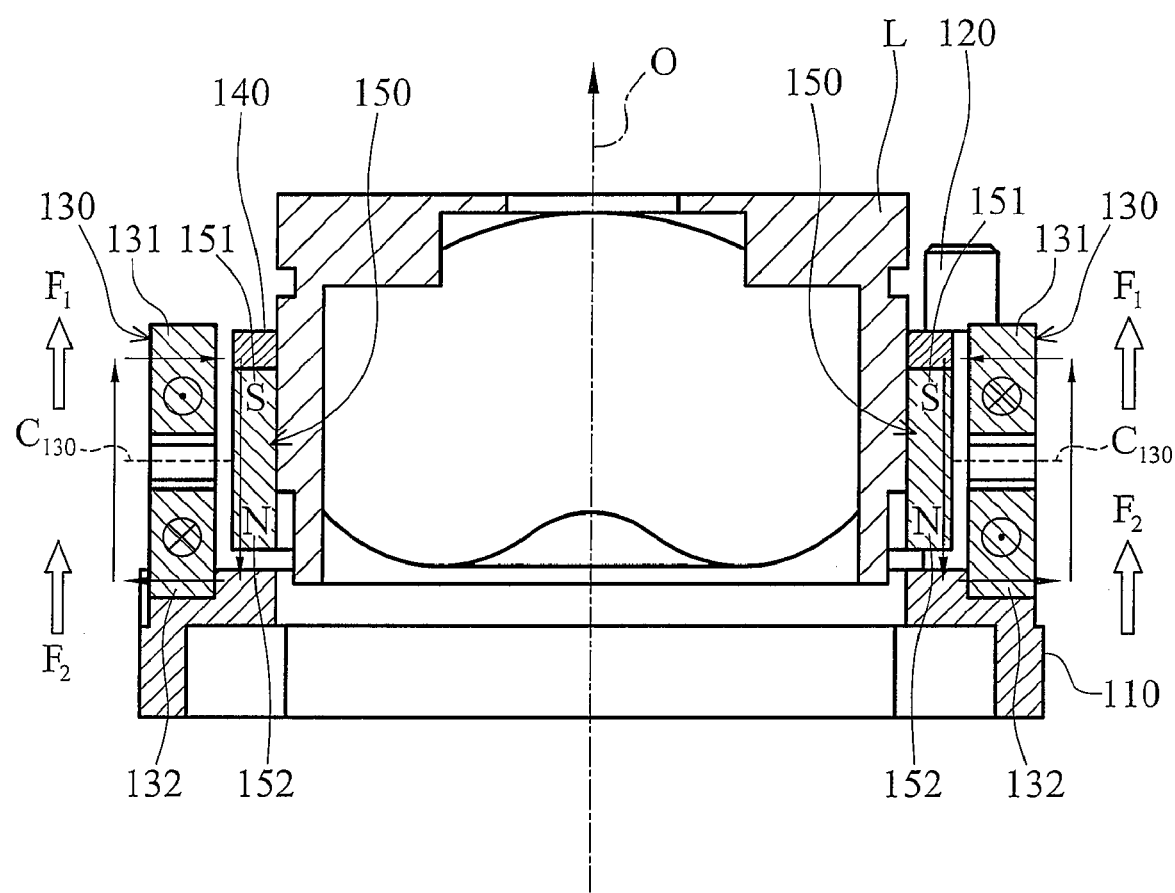
FIG. 3 is a schematic cross section of FIG. 2B.

The coils 130 are connected to the fixed base 110. As shown in FIG. 2B and FIG. 3, each coil 130 comprises a first winding portion 131 and a second winding portion 132 connected to and opposite the first winding portion 131. Specifically, as the first winding portion 131 and second winding portion 132 construct the loop of each coil 130, a current direction in the first winding portion 131 is opposite to that in the second winding portion 132.

The support base 140 is movably fit on the guide bars 120. Specifically, as shown in FIG. 2A, the support base 140 comprises two through holes 141 in which the guide bars 120 are fit. Namely, the support base 140 is fit on the guide bars 120 via the through holes 141. Moreover, the support base 140 can support a lens module L, as shown in FIG. 2B and FIG. 3.

As shown in FIG. 2B and FIG. 3, the magnetic members 150 are connected to the support base 140. Specifically, a magnetization direction of each magnetic member 150 parallels a moving direction of the support base 140 and each magnetic member 150 and is perpendicular to a central axis $C_{130}$ of each coil 130. Additionally, as shown in FIG. 3, each magnetic member 150 comprises a first magnetic pole 151 and a second magnetic pole 152. The first magnetic pole 151 and second magnetic pole 152 oppose the first winding portion 131 and second winding portion 132 of each coil 130, respectively. Moreover, in this embodiment, the magnetic members 150 may be permanent magnets.

Accordingly, the magnetic members 150 provide closed magnetic lines vertically passing through the first winding portion 131 and second winding portion 132 of each coil 130. For example, referring to the magnetic member 150 and coil 130 at the right part of FIG. 3, the first magnetic pole 151 and second magnetic pole 152 of the magnetic member 150 are respectively an S pole and a N pole, the current directions in the first winding portion 131 and second winding portion 132 of the coil 130 are respectively referred to as flowing in and flowing out, and the direction of the magnetic lines vertically passing through the first winding portion 131 is opposite to that vertically passing through the second winding portion 132. When the coil 130 is energized by application of a current, according to the Lorentz's law, the first magnetic pole 151 interacts with the first winding portion 131 to generate a first force $F_1$ (i.e. the magnetic lines provided by the magnetic member 150 interact with the current in the first winding portion 131 to generate a first force $F_1$) and the second magnetic pole 152 interacts with the second winding portion 132 to generate a second force $F_2$ (i.e. the magnetic lines provided by the magnetic member 150 interact with the current in the second winding portion 132 to generate a second force $F_2$). Here, the direction of the first force $F_1$ is the same as that of the second force $F_2$. Accordingly, driven by the resultant of the first force $F_1$ and second force $F_2$, the support base 140 and magnetic members 150 can move along the magnetization direction of the magnetic members 150.

When the voice coil motor 101 is employed to drive a lens module L of a camera to perform zoom movement, the construction is shown in FIG. 2B and FIG. 3. The lens module L is supported by the support base 140 and provided with an optical axis O. The magnetization direction of the magnetic members 150 parallels the optical axis O. At this point, the resultant of the first force $F_1$ and second force $F_2$ generated according to the Lorentz's law and parallel to the optical axis O drives the lens module L, support base 140, and magnetic members 150 to move along the optical axis O or magnetization direction of the magnetic members 150.

Moreover, as the guide bars 120 comprise non-magnetic-permeable material, no magnetic attraction exists between the guide bars 120 and the magnetic members 150. Accordingly, when the support base 140 moves on the guide bars 120, friction therebetween is minimal. A starting current required for the voice coil motor 101 to overcome the friction between the support base 140 and the guide bars 120 is thus reduced.

Additionally, the voice coil motor 101 is not limited to having two coils 130 and two magnetic members 150. Namely, the voice coil motor 101 may have merely a coil 130 and a magnetic member 150, achieving the same effect of driving the support base 140 and magnetic members 150 to move along the magnetization direction of the magnetic members 150.

Furthermore, the voice coil motor 101 is not limited to having two magnetic members 150. Specifically, the voice coil motor 101 may have merely an L-type magnetic member and the two coils 130 respectively oppose two adjacent lateral sides of the L-type magnetic member, achieving the effect of driving the support base 140 and L-type magnetic member to move along the magnetization direction of the L-type magnetic member.

Second Embodiment

Elements corresponding to those in the first embodiment share the same reference numerals.

Figure 4:
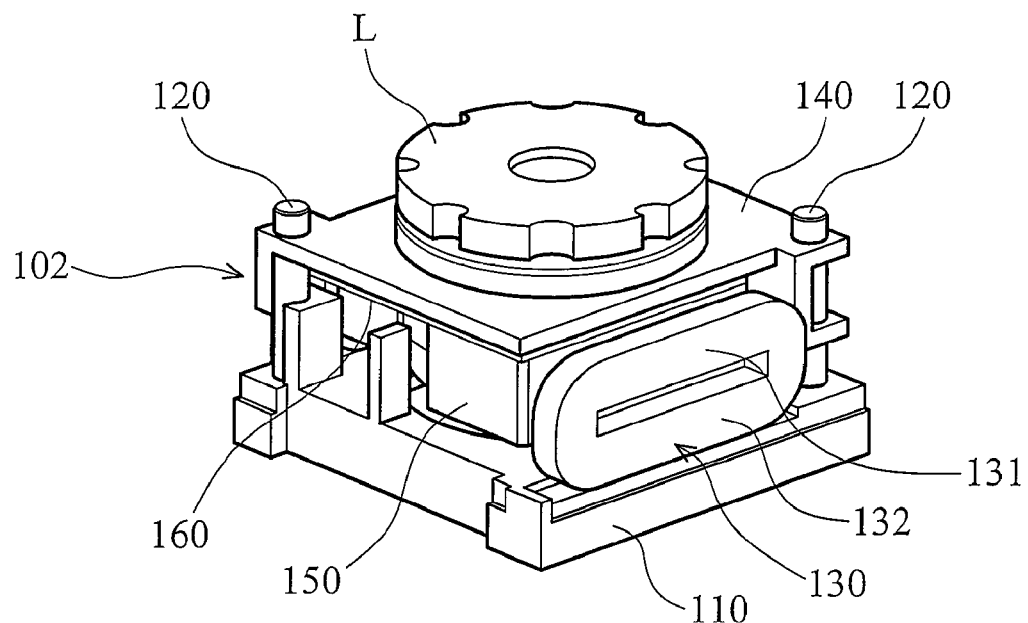
FIG. 4 is a perspective assembly view of a lens module and a voice coil motor of a second embodiment of the invention.

Referring to FIG. 4, the major difference between this and the first embodiments is that a voice coil motor 102 of this embodiment further comprises a magnetic-permeable yoke 160.

The magnetic-permeable yoke 160 is disposed between the support base 140 and the magnetic members 150, enhancing utilization of magnetic flux from the magnetic members 150, and further increasing the first force $F_1$ and second force $F_2$ generated between the coils 130 and the magnetic members 150 according to the Lorentz's law.

Structure, disposition, and function of other elements in this embodiment are the same as those in the first embodiment, and explanation thereof is omitted for simplicity.

Third Embodiment

Elements corresponding to those in the first embodiment share the same reference numerals.

Figure 5:
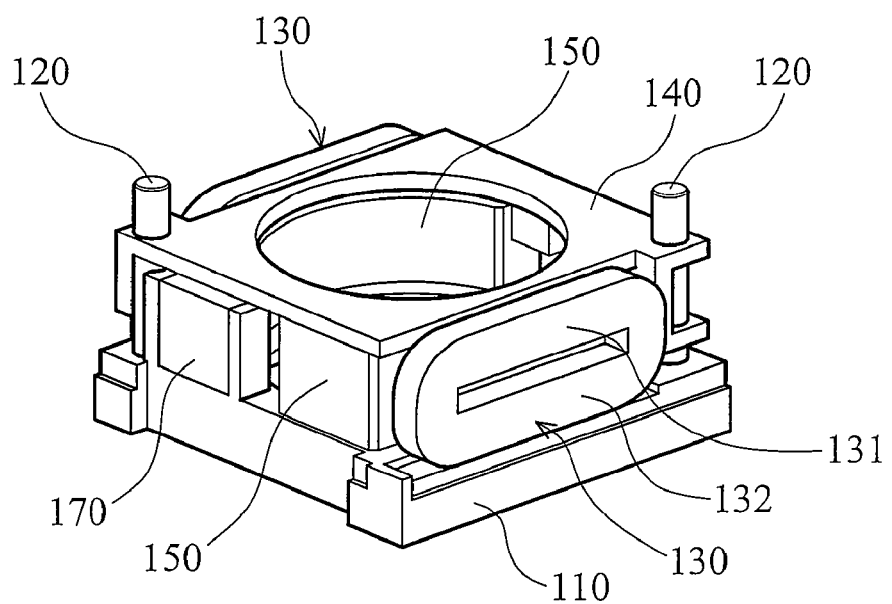
FIG. 5 is a perspective view of a voice coil motor of a third embodiment of the invention.

Referring to FIG. 5, the major difference between this and the first embodiments is that a voice coil motor 103 of this embodiment further comprises a position sensor 170.

The position sensor 170 is connected to the fixed base 110 and opposes one of the magnetic members 150, detecting movement of the magnetic members 150. In this embodiment, the position sensor 170 may be a Hall sensor, a magnetic resistance sensing element, an electrical sensing element, or a light sensing element.

Structure, disposition, and function of other elements in this embodiment are the same as those in the first embodiment, and explanation thereof is omitted for simplicity.

When the support base 140 and magnetic members 150 move along the magnetization direction of the magnetic members 150, the position sensor 170 (Hall sensor or magnetic resistance sensing element) detects the intensity of a magnetic field, in a fixed position in the voice coil motor 103, provided by the magnetic members 150. Here, the intensity of the magnetic field, in the fixed position, provided by the magnetic members 150 is related to displacement of the magnetic members 150. By combining the position sensor 170 with a positioning controller (not shown), closed-loop positioning control can be obtained. The moving position of the support base 140 and magnetic members 150 is thus controlled.

In conclusion, the disclosed voice coil motors provides the following advantages. Based upon the aforementioned arrangement of the coils and magnetic members, the magnetic lines provided with different directions or routes can be simultaneously utilized, thereby increasing the resultant (first force $F_1$ and second force $F_2$) generated according to the Lorentz's law. Further, Based upon the aforementioned arrangement of the coils and magnetic members, the magnetic lines provided with different directions or routes can be simultaneously utilized, thereby enhancing the utilization of the magnetic flux. Thus, the voice coil motors can generate a sufficient voice coil force in the absence of a magnetic-permeable yoke, such that the size and manufacturing costs of the voice coil motors can be reduced. Moreover, as hollow portions of the coils are not penetrated by members, the size of the hollow portions is reduced. Namely, the coils are provided with increased winding turns, enhancing the voice coil force and providing enhanced overall strength. Alternatively, as the hollow portions of the coils are penetrated by no member, the size of the hollow portions is reduced, thereby reducing the overall size of the voice coil motors. Additionally, only one gap exists between the magnetic members (fixed members) and the coils (movable members), such that the voice coil motors can be miniaturized. Furthermore, as disposition of the position sensor is not confined by the size and position of the coils, the arrangement of the members in the voice coil motors is flexible, advantageously reducing the overall size of the voice coil motors.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A voice coil motor, comprising:
   a fixed base;
   at least one guide bar connected to the fixed base;
   at least one coil connected to the fixed base and comprising a first winding portion and a second winding portion connected to and opposite the first winding portion, wherein a current direction in the first winding portion is opposite to that in the second winding portion;
   a support base movably fit on the guide bar; and
   at least one magnetic member connected to the support base and comprising a first magnetic pole and a second magnetic pole, wherein a magnetization direction of the magnetic member parallels a moving direction of the support base and magnetic member and is perpendicular to a central axis of the coil, the first and second magnetic poles respectively oppose the first and second winding portions of the coil, the first magnetic pole interacts with the first winding portion to generate a first force, the second magnetic pole interacts with the second winding portion to generate a second force, and the first and second forces drive the support base and magnetic member to move along the magnetization direction of the magnetic member.

2. The voice coil motor as claimed in claim 1, wherein the guide bar comprises non-magnetic-permeable material.

3. The voice coil motor as claimed in claim 1, wherein the guide bar is integrally formed with the fixed base.

4. The voice coil motor as claimed in claim 1, further comprising a magnetic-permeable yoke disposed between the support base and the magnetic member.

5. The voice coil motor as claimed in claim 1, further comprising a position sensor connected to the fixed base and opposing the magnetic member, detecting movement of the magnetic member.

6. The voice coil motor as claimed in claim 5, wherein the position sensor comprises a Hall sensor, a magnetic resistance sensing element, an electrical sensing element, or a light sensing element.

* * * * *